Jan. 17, 1961 J. Z. DE LOREAN 2,968,197
TRANSMISSION
Filed March 14, 1958
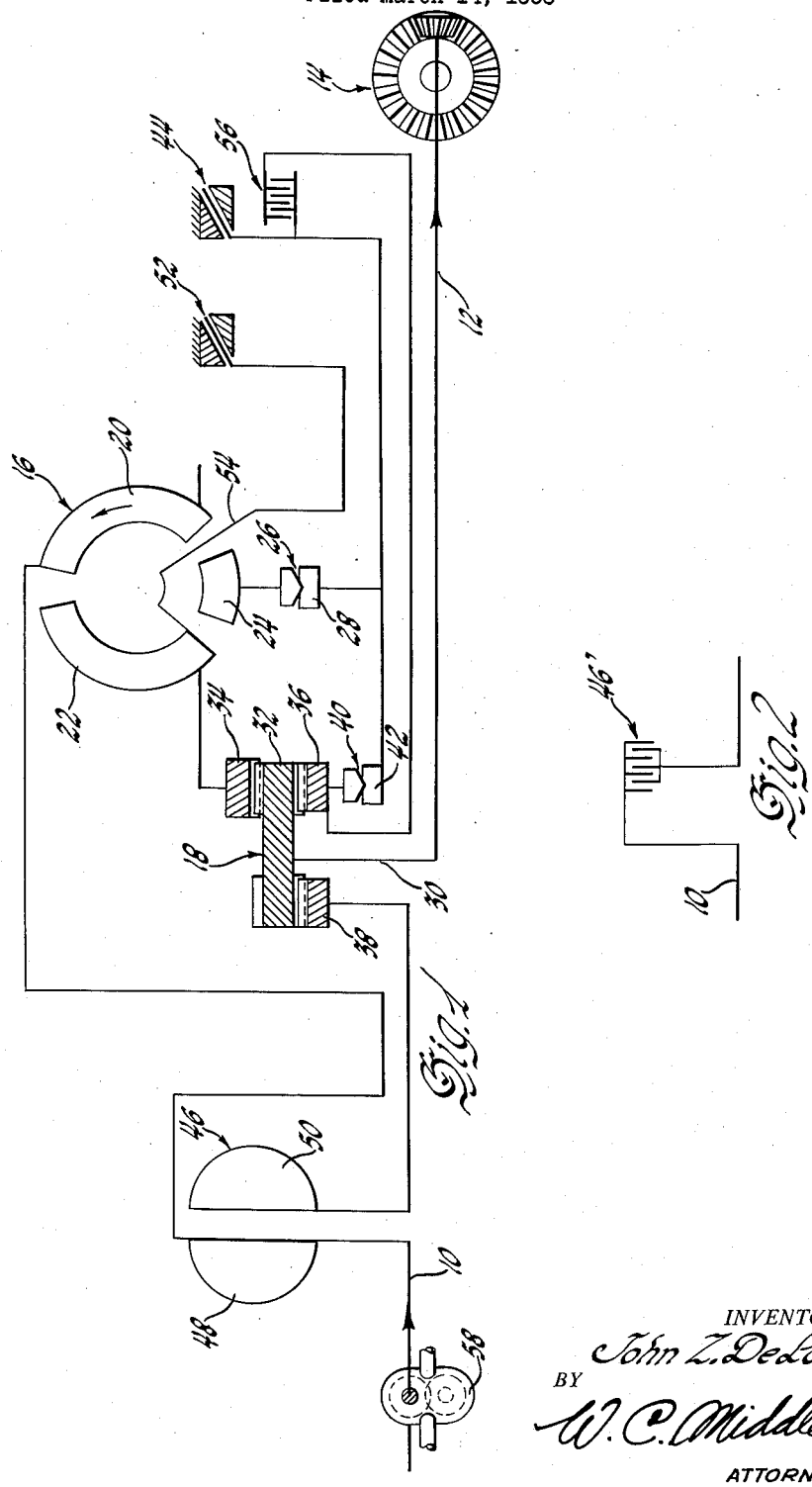
INVENTOR.
John Z. DeLorean
BY
W. C. Middleton
ATTORNEY

United States Patent Office 2,968,197
Patented Jan. 17, 1961

2,968,197
TRANSMISSION

John Z. De Lorean, Birmingham, Mich., assignor to General Motors Corporation, Detroit, Mich., a corporation of Delaware Filed Mar. 14, 1958, Ser. No. 721,455

13 Claims. (Cl. 74—688)

The invention relates to transmissions and particularly to automatic transmissions of the character adapted, although not exclusively, for use in motor vehicles.

Some of the factors influencing automatic transmission design include cost, size, simplicity, efficiency, braking ability, etc. Moreover, a transmission of this character should ideally afford both low speed high torque and high speed low torque drives with each calibrated for maximum efficiency without costly and expensive controls.

With the foregoing in mind, the invention contemplates a transmission that is of simple, compact, and low cost structure utilizing a minimum number of components uniquely arranged, that is suitable for installation in either the front or the rear of the vehicle without excessive space requirements, that operates efficiently in both the low speed high torque and high speed low torque drive ranges provided and that offers effective engine braking.

Another objective of the invention is to provide a transmission with a split torque drive for efficient operation at higher speeds, the torque proceeding via different paths to the output connected gearing, thus reducing the influence of fluid losses in either path.

More specifically, the invention affords a transmission that combines gearing and ratio changing devices therefor with a hydrodynamic torque transmitting mechanism to furnish a plurality of forward drive ratios determined both by the gearing and the torque transmitting mechanism and a reverse drive in which the torque transmitting mechanism initiates the reversal of torque before transferred to the gearing.

According to one form of the invention a hydrodynamic torque transmitting mechanism, such as a torque converter, is combined with planetary gearing to transfer, between an input and an output, drive at variable ratios over a selected range. The torque converter and the gearing combine initially in a low speed range to afford the greatest torque multiplication with that from the torque converter decreasing as speed increases until most of the torque multiplication is provided by the gearing establishing a high speed range. To increase the effectiveness of this drive in the high speed range, a clutch device, or equivalent, is arranged between the input and the gearing and is rendered operative to reduce fluid losses from the torque converter by furnishing a two-way drive to the gearing, one through the topque converter 16 and the other through the clutch device so that the ratio approaches 1 to 1. Hence, converter losses have less influence upon the overall drive since the converter contribution is reduced. Also, for reverse drive the torque converter is utilized to reverse the torque, utilizing the same gearing which, due to the reversal of torque, augments the ratio thereof and drives the output backwards.

The foregoing and other objects and advantages of the invention will be apparent from the following description and from the accompanying drawings, in which:

Figure 1 is a schematic illustration of a transmission demonstrating the principles of the invention; and Figure 2 illustrates schematically a modification of a part of the transmission.

Referring to the drawings, the transmission in one form is shown especially constructed for installation in the rear of a vehicle. An input shaft 10 is appropriately connected to the vehicle engine (not shown) while an output shaft 12 is drive connected to rear axle gearing, designated generally at 14. Drive between the shafts 10 and 12 is transferred by a hydrodynamic torque transmitting mechanism, e.g., torque converter 16, and planetary gearing 18 in a plurality of ratios within a predetermined range.

The torque converter 16 may be of known construction comprising an impeller 20 revolvable by the input shaft 10, a turbine 22, and a turbine-stator 24. These converter elements combine to afford a fluid working circuit in which, with the impeller 20 being revolved forwardly, fluid will circulate in a counterclockwise direction. To resist the tendency of the stator 24 to revolve backwards in the torque converter range, a one-way device 26 is furnished and has the inner race 28 thereof held, as will be explained. The one-way device 26 may be of suitable structure, utilizing one-way elements such as sprags, rollers, and the like, and of the kind that prevents relative rotation between two members in one direction and allows relative rotation therebetween in an opposite direction. When the torque converter 16 approaches the coupling point, at which time the fluid leaving the turbine 22 tends to revolve the stator 24 forwardly, the one-way device 26 will release and the torque converter 16 will be in the coupling range and no longer multiplies torque.

The planetary gearing 18 has a planet carrier 30, on which a series of elongated planet pinions 32 are journaled, drive connected to the output shaft 12. Planet pinions 32 at one end intermesh with a ring gear 34 joined to the converter turbine 22 and a reaction sun gear 36, while on the opposite side they mesh with a sun gear 38, preferably, the same size as the reaction sun gear 36. Reverse rotation of the reaction sun gear 36 is resisted by a one-way device 40 which is similar to the stator one-way device 26 and which has the inner race 42 thereof prevented from rotation by a forward brake 44. The brake 44 is depicted as a cone type, but may be of the disk, band, or of any other known kind. With the reaction sun gear 36 restrained from reverse rotation and the ring gear 34 being driven forwardly by the converter turbine 22, the planet carrier 30 and, accordingly, the output shaft 12 will be revolved also forwardly, but at a reduced speed thereby establishing a low speed drive through the gearing.

To condition the gearing 18 for higher speed drive, another hydrodynamic torque transmitting mechanism, such as fluid coupling 46, is employed which includes a pump 48 revolved by the input shaft 10 and a turbine 50 connected to the sun gear 38. When the fluid coupling 46 is filled, the fluid therein will cause the drive to be transferred between the pump 48 and the turbine 50, whereupon the sun gear 38 will be revolved at substantially the same speed as the input shaft 10, a slight difference in speeds being due to the inherent slippage within the coupling 46. With the coupling 46 operative, drive will be transferred both to the ring gear 34 and the sun gear 38 affording a two path split torque drive, one path being through the coupling 46 and the other path through the converter 16.

The function of the one-way device 40 is to permit the sun gear 36 to revolve forwardly with the sun gear 38. This the sun gear 38 will do because of the split sun gear aspect of the gearing 18 and the fact that the two sun gears 36 and 38 are identical in size; for, the action of both will be the same, i.e., if forward drive is imparted to one sun gear, the other will be revolved in the same direction and at the same speed, and similarly if one is held the other will remain stationary. The advantage of the split sun gear is believed apparent from the drawings, since it is possible to transfer drive via the planet carrier 30 to the output shaft 12, while having the gear controls on each side of the gearing 18.

Although the fluid coupling 46 has certain advantages, among which are the ability to produce a smooth and gradual change in ratio simply by dumping and filling the coupling with fluid and the capacity for absorbing shocks and jars, there may be installations in which it is desirable to use some other type clutch. Hence, in Figure 2, a modified clutch 46' is depicted in place of the coupling 46. This clutch 46' may employ multiple disks, or the like, for transmitting the desired torque and would generally cost less to fabricate than a fluid coupling.

To obtain reverse drive, the converter turbine 22 and therefore the ring gear 34 are held stationary by a reverse brake 52 through the agency of a spider member 54, especially designed to extend through the converter working circuit without perceptibly interfering therewith. As with the forward brake 44, the reverse brake 52 may be of any known construction and is here depicted as a cone brake. When the reverse brake 52 is engaged, necessarily the forward brake 44 is released and then by the construction of the torque converter 16, the stationary turbine 22 will cause the stator 24 to be driven backwards which, without the restraint of the forward brake 44, will cause the one-way device 26 to carry therewith its inner race 28 and the inner race 42 of the one-way device 40. Since the one-way device 40 will release under these conditions, a reverse clutch 56 is installed between the reaction sun gear 36 and the inner race 28 of the one-way device 26 and is engaged in reverse. Reverse drive from the stator 24 is then transferred around the released one-way device 40 to the reaction sun gear 36, in turn, causing, with the ring gear 34 stationary, the planet carrier 30 and the output shaft 12 to be revolved backwards at a reduced speed.

Fluid pressure for the various fluid operated components of the transmission and an appropriate control system therefor may be supplied by a pump, shown generally at 58. Preferably, the pump 58 is driven by the input shaft 10 so as to furnish pressure fluid whenever the vehicle engine is running.

The versatility of the transmission is further demonstrated in that an engine braking range can be obtained when the transmission is conditioned for forward drive simply by utilizing parts already available. This is accomplished by engaging the reverse clutch 56 and filling the coupling 46 at the same time that the forward brake 44 is engaged. Therefore, with the output shaft 12 driving, as it will be with the vehicle wheels driving, drive will proceed therefrom through the gearing 18 and to the coupling turbine 50 as well as through the torque converter 16. By engaging reverse clutch 56, the forward brake 44 still provides reaction resisting forward rotation of sun gear 36 which would otherwise be allowed by one-way device 26. Therefore, with the carrier 30 driving, the converter turbine 22 and accordingly the coupling impeller 48 will be overdriven and the coupling 46 will operate as a churn brake endeavoring to overdrive the engine. This is because, as mentioned, the action of sun gear 38 will be the same as sun gear 36, and since sun gear 36 is prevented from rotation, sun gear 38 will be held as will the connected coupling turbine 50. With the coupling turbine 50 stationary, rotation of the coupling impeller 48 will be resisted by the so-called churning effect. The resultant increased braking will offer greater resistance to vehicle movement. The engine braking effect from the torque converter 16 is, by the nature of the converter, relatively ineffective since the converter is designed specifically for forward driving and when driven backwards becomes very ineffective. However, with a fluid coupling a compromise can more easily be made in the design thereof enabling it to operate in either direction without impairing its efficiency.

To summarize the operation of the transmission, assume first that the engine is running and that the clutch 56 and brakes 44 and 52 are all disengaged and the coupling 46 is empty. As a result, the transmission will be in Neutral and incapable of transferring any drive to the output shaft 12. To commence forward drive, the forward brake 44 is engaged whereupon drive will be transferred from the input shaft 10 through the torque converter 16 and the gearing 18 at a ratio determined both by the torque multiplication from the converter 16 and the ratio of the gearing 18. As the speed of the vehicle increases the torque multiplication from the torque converter 16 will gradually reduce until the coupling point is attained, as previously explained, and the ratio will be determined almost entirely by the gearing 18. The coupling 46 is now desirably filled affording the two drive paths to the gearing 18, described before, and, except for converter and coupling slippage, a substantially direct drive. It is to be understood that the coupling 46 may be rendered operative at any selected time, e.g., before, at, or after attainment of the converter coupling point, dependent on the intended application.

For reverse, as explained, the reverse brake 52 and the reverse clutch 56 are engaged while the forward brake 44 and the coupling 46 are rendered inoperative. Drive is from the input shaft 10 through the torque converter 16 to the reaction sun gear 36, which is revolved backwards by the converter 16, and thence in a reverse direction at a reduced speed to the output shaft 12 via the planet carrier 30.

From the foregoing it can be seen that the invention provides a very simplified transmission having a minimum number of components ideally arranged so as to serve multiple functions and thereby afford a low cost structure. Moreover, considerable ratio coverage is obtainable by the mode of combining the gearing and the torque converter in one operating range, and, when economy is desired, a smooth and relatively imperceptible shift is produced to change the status of the gearing and supply a split torque drive thereto with a resultant minimization of fluid losses.

The invention is to be limited only by the following claims.

I claim:

1. In a transmission, the combination of an input, an output, a first hydrodynamic torque transmitting mechanism adapted to be connected to the input, planetary gearing including a driving element revolvable by the first torque transmitting mechanism, a driven element revolvable with the output, and a reaction element, forward brake means for holding the reaction element so as to condition the gearing for low speed forward drive, a second hydrodynamic torque transmitting mechanism interposed between the input and one of the planetary gearing elements and arranged, when filled with fluid, to cause the gearing to be conditioned for a relatively high speed forward drive with both of the torque transmitting mechanisms supplying drive thereto, the second hydrodynamic torque transmitting device also being arranged to brake the impact so as to afford overrun braking, a one-way device between the forward brake means and the reaction element adapted to allow free forward rotation thereof when the second torque transmitting mechanism is filled, and reverse brake means cooperating with the first torque transmitting mechanism to hold the driving element stationary and thereby cause the reaction element to be revolved backwards for reverse drive with the forward brake means released and the second torque transmitting mechanism empty.

2. In a transmission having forward drive and overrun braking operating ranges, the combination of an input, an output, a hydrodynamic torque transmitting mechanism including an impeller revolvable with the input and a plurality of turbines, a planetary gear set having a primary driving element revolvable with one of the turbines, a secondary driving element, a reaction element, and an output planet carrier adapted to be connected to the output, the output planet carrier having a planet pinion journalled thereon intermeshing with each of the elements, forward brake means for preventing reverse rotation of another of the turbines and the reaction element so as to condition both the torque transmitting mechanism and the gear set for low speed forward drive in the forward drive operating range, clutch and brake means interposed between the input and the secondary driving element and operative in the forward drive operating range to perform as a clutch so as to cause the gear set to be conditioned for a relatively high speed forward drive with both the primary and secondary driving elements supplying drive thereto and in the overrun braking operating range to perform as a brake so as to resist rotation of the input, a one-way device between the forward brake means and the reaction element arranged to allow free forward rotation thereof when the clutch means is operative in the forward drive operating range, and means operative in the overrun braking range so as to cause the forward brake means to prevent rotation of the reaction element in either direction thereby rendering the clutch and brake means operative as a brake for providing overrun braking.

3. In a transmission, the combination of an input, an output, a first hydrodynamic torque transmitting mechanism including an impeller revolvable with the input and a plurality of turbines, a planetary gear set having a primary driving element revolvable with one of the turbines, a secondary driving element, a reaction element, and a driven element adapted to be connected to the output, forward brake means for preventing reverse rotation of another of the turbines and the reaction element so as to condition both the torque transmitting mechanism and the gear set for low speed forward drive, a second hydrodynamic torque transmitting mechanism including a driving member revolvable with the input and a driven member revolvable with the secondary driving element, the second torque transmitting mechanism when filled with fluid causing the gear set to be conditioned for a relatively high speed forward drive with both the primary and secondary driving elements supplying drive thereto, a one-way device between the forward brake means and the reaction element arranged to allow free forward rotation thereof when the second torque transmitting mechanism is filled, reverse brake means for preventing rotation of said one of the first torque transmitting mechanism turbines, said another of the first torque transmitting mechanism turbines being constructed to be revolved backwards with the forward brake means released, the second torque transmitting mechanism empty, and the reverse brake means operative, and clutch means operative in reverse for connecting the said another of the first torque transmitting mechanism turbines to the reaction element to cause the output to be revolved backwards thereby and establish reverse drive.

4. In a transmission, the combination of an input, an output, a first hydrodynamic torque transmitting mechanism including an impeller revolvable with the input and a plurality of turbines, a planetary gear set having a ring gear revolvable with one of the turbines, a pair of sun gears, a planetary gear journaled on a carrier and meshing with the ring and sun gears, the carrier being adapted to be connected to the output, forward brake means for preventing reverse rotation of another of the turbines and one of the sun gears so as to condition both the torque transmitting mechanism and the gear set for low speed forward drive, a second hydrodynamic torque transmitting mechanism including a driving member revolvable with the input and a driven member revolvable with another of the sun gears, the second torque transmitting mechanism when filled with fluid causing the gear set to be conditioned for a relatively high speed forward drive with both mechanisms supplying drive thereto, a one-way device between the forward brake means and said one of the sun gears arranged to allow free forward rotation thereof when the second torque transmitting mechanism is filled, reverse brake means for preventing rotation of said one of the first torque transmitting mechanism turbines, said another of the first torque transmitting mechanism turbines being constructed to be revolved backwards with the forward brake means released, the second torque transmitting mechanism empty, and the reverse brake means operative, and clutch means operative in reverse for connecting said another of the turbines to said one sun gear to cause the output to be revolved backwards thereby and establish reverse drive.

5. In a transmission having forward drive and overrun braking operating ranges, the combination of an input, an output, a torque converter including an impeller revolvable with the input, a turbine and a stator, a planetary gear set having a ring gear revolvable with the turbine, a pair of sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive in the forward drive operating range, clutch and brake means operative in the forward drive operating range for connecting the input and another of the sun gears so as to cause the gear set to be conditioned for a relatively high speed forward two-way drive and in the overrun braking operating range for resisting rotation of the input, a one-way device between the forward brake means and said one of the sun gears arranged to allow free forward rotation when the clutch and brake means is operative in the forward drive operating range, and means operative in the overrun braking operating range so as to cause said one of the sun gears to be prevented from rotation in either direction by the forward brake means thereby rendering the clutch and brake means operative as a brake for providing overrun braking.

6. In a transmission, the combination of an input, an output, a torque converter including an impeller revolvable with the input, a turbine and a stator, a planetary gear set having a ring gear revolvable with the turbine, a pair of sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive, first clutch means for connecting the input and another of the sun gears so as to cause the gear set to be conditioned for a relatively high speed forward two-way drive, a one-way device between the forward brake means and said one of the sun gears arranged to allow free forward rotation thereof unrestricted by the forward brake means when the first clutch means is operative, reverse brake means for preventing rotation of the torque converter turbine, the stator being constructed to be revolved backwards with the forward brake means and the first clutch means released and the reverse brake means operative, and second clutch means operative in reverse for connecting the stator to said one sun gear to cause the output to be revolved backwards thereby and establish reverse drive.

7. In a transmission, the combination of an input, an output, a torque converter including an impeller revolvable with the input, a turbine and a stator, a planetary gear set having a ring gear revolvable with the turbine, a pair of sun gears, a planetary gear journaled on a carrier and meshing with the ring and sun gears, the carrier being adapted to be connected to the output, forward brake means preventing reverse rotation of the stator and one of the sun gears so as to condition both the torque converter and the gear set for low speed forward drive, a fluid coupling including a pump revolvable with the input and a turbine revolvable with another of the sun gears, the coupling when filled with fluid causing the gear set to be conditioned for a relatively high speed forward two-way drive, a one-way device between the forward brake means and said one of the sun gears arranged to allow free forward rotation thereof when the coupling is filled, reverse brake means for preventing rotation of the torque converter turbine, the stator being constructed to be revolved backwards with the forward brake means released, the fluid coupling empty, and the reverse brake means operative, and clutch means operative in reverse for connecting the stator to said one sun gear to cause the output to be revolved backwards thereby and establish reverse drive.

8. In a transmission having forward drive and overrun braking operating ranges, the combination of an input, an output, a torque converter including an impeller revolvable with the input, a turbine and a stator, a planetary gear set having a ring gear revolvable with the turbine, a pair of the same size sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive in the forward drive operating range, a first one-way device between the forward brake means and the stator arranged to allow the stator to revolve forwardly unrestricted by the forward brake means, clutch and brake means arranged to perform both as a clutch for connecting the input and another of the sun gears so as to cause the gear set to be conditioned for a relatively high speed forward two-way drive in the forward drive operating range and as a brake for resisting rotation of the input in the overrun braking range, a second one-way device between the forward brake means and said one of the sun gears arranged to allow free forward rotation thereof when the first clutch means is operative in the forward drive operating range, and clutch means operative in the overrun braking operating range for by-passing the second one-way device so as to cause both of the sun gears to be prevented from rotation in either direction by the forward brake means thereby rendering the clutch and brake means operative as a brake for providing overrun braking.

9. In a transmission having forward drive and overrun braking operating ranges, the combination of an input, an output, a torque converter including an impeller revolvable with the input, a turbine and a stator, a planetary gear set having a ring gear revolvable with the turbine, a pair of the same size sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive in the forward drive operating range, a first one-way device between the forward brake means and the stator arranged to allow the stator to revolve forwardly unrestricted by the forward brake means, a fluid coupling including a pump revolvable with the input and a turbine revolvable with another of the sun gears, the coupling when filled with fluid being arranged so as to cause the gear set to be conditioned for a relatively high speed forward two-way drive in the forward drive operating range and so as to perform as a brake in the overrun braking operating range, a second one-way device between the forward brake means and said one of the sun gears arranged to allow free forward rotation thereof when the coupling is filled in the forward drive operating range, and clutch means operative in the overrun braking range for by-passing the second one-way device so as to cause both of the sun gears and accordingly the fluid coupling turbine to be prevented from rotation in either direction by the forward brake means thereby affording overrun braking.

10. In a transmission, the combination of an input, an output, a torque converter including an impeller revolvable with the input, a turbine and a stator, a planetary gear set having a ring gear revolvable with the turbine, a pair of the same size sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive, a one-way device between the forward brake means and the stator arranged to allow the stator to revolve forwardly unrestricted by the forward brake means, first clutch means for connecting the input and another of the sun gears so as to cause the gear set to be conditioned for a relatively high speed forward two-way drive, a one-way device between the forward brake means and said one of the sun gears arranged to allow free forward rotation thereof when the first clutch means is operative, reverse brake means for preventing rotation of the torque converter turbine and the ring gear, the stator being constructed to be revolved backwards with the forward brake means and the first clutch means released and the reverse brake means operative, and second clutch means operative in reverse for connecting the stator to said one sun gear to cause the output to be revolved backwards thereby and establish reverse drive.

11. In a transmission, the combination of an input, an output, a torque converter including an impeller revolvable with the input, a turbine and a stator, a planetary gear set having a ring gear revolvable with the turbine, a pair of the same size sun gears, a planetary gear journaled on a carrier and meshing with the ring and sun gears, the carrier being adapted to be connected to the output, forward brake means for preventing reverse rotation of the stator and one of the sun gears so as to condition both the torque converter and the gear set for low speed forward drive, a one-way device between the forward brake means and the stator arranged to allow the stator to revolve forwardly unrestricted by the forward brake means, a fluid coupling including a pump revolvable with the input and a turbine revolvable with another of the sun gears, the coupling when filled with fluid causing the gear set to be conditioned for a relatively high speed forward two-way drive, a one-way device between the forward brake means and said one of the sun gears arranged to allow free forward rotation thereof when the fluid coupling is filled, reverse brake means for preventing rotation of the torque converter turbine and the ring gear, the stator being constructed to be revolved backwards with the forward brake means released, the fluid coupling empty, and the reverse brake means operative, and clutch means operative in reverse for connecting the stator to said one sun gear to cause the output to be revolved backwards thereby and establish reverse drive.

12. In a transmission having forward drive, reverse drive, and overrun braking operating ranges, the combination of an input, an output, a first hydrodynamic torque transmitting mechanism adapted to be connected to the input, planetary gearing including a driving element revolvable by the first torque transmitting mechanism, a driven element revolvable with the output, and a reaction element, forward brake means for holding the reaction element so as to condition the gearing for low speed forward drive in the forward drive operating range, a second hydrodynamic torque transmitting mechanism interposed between the input and one of the planetary gearing elements and arranged when filled with fluid in the forward drive operating range to cause the gearing to be conditioned for a relatively high speed forward drive with both of the torque transmitting mechanisms supplying drive thereto and in the overrun braking operating range to perform as a fluid brake and resist rotation of the input, a one-way device between the forward brake means and the reaction element adapted to allow free forward rotation thereof when the second torque transmitting mechanism is filled and is performing in the forward drive operating range, means causing the second hydrodynamic torque transmitting mechanism to perform as a fluid brake when the overrun braking operating range is effective, and reverse brake means cooperating with the first torque transmitting means to hold the driving element stationary and thereby cause the reaction element to be revolved backwards in the reverse drive operating range with the forward brake means released and the second torque transmitting means empty.

13. In a transmission having forward drive, reverse drive and overrun braking operating ranges, the combination of an input, an output, a first hydrodynamic torque transmitting mechanism adapted to be connected to the input, planetary gearing including a driving element revolvable by the first torque transmitting mechanism, a driven element revolvable with the output and a reaction element, forward brake means holding the reaction element so as to condition the gearing for a low speed forward drive, a second hydrodynamic torque transmitting mechanism interposed between input and one of the planetary gearing elements, the second hydrodynamic torque transmitting mechanism being arranged when filled with fluid to cause the gearing to be conditioned for a relatively high speed forward drive with both of the torque transmitting mechanisms supplying drive thereto and in the overrun braking operating range to perform as a brake so as to resist rotation of the input, a one-way device between the forward brake means and the reaction element arranged to allow free forward rotation thereof when the second hydrodynamic torque transmitting mechanism is filled with fluid in the forward drive operating range, reverse brake means cooperating with the first torque transmitting mechanism to hold the driving element stationary and thereby cause the reaction element to be revolved backwards for reverse drive with the forward brake means released and the second torque transmitting mechanism empty, and clutch means operative in the overrun braking range so as to cause the forward brake means to prevent rotation of the reaction element in either direction thereby rendering the second hydrodynamic torque transmitting device operative as a brake for providing overrun braking, the clutch means being also operative in the reverse drive operating range to connect the first torque transmitting mechanism directly to the reaction element and thereby cause the reaction element to be revolved backwards for reverse drive of the output.

References Cited in the file of this patent

UNITED STATES PATENTS

| | | |
|---|---|---|
| 2,312,849 | Pollard | Mar. 2, 1943 |
| 2,687,657 | Kugel et al. | Aug. 31, 1954 |
| 2,695,533 | Pollard | Nov. 30, 1954 |
| 2,851,906 | De Lorean | Sept. 16, 1958 |
| 2,890,602 | Smirl et al. | June 16, 1959 |
| 2,908,190 | Hause | Oct. 13, 1959 |